Patented Sept. 26, 1944

2,359,227

UNITED STATES PATENT OFFICE 2,359,227

HALOGENATION OF ACYL ANILIDES

John E. Livak and Cleo D. Carlson, Midland, Mich., assignors to The Dow Chemical Company, Midland, Mich., a corporation of Michigan No Drawing. Application July 28, 1941,
Serial No. 404,390

7 Claims. (Cl. 260—562)

This invention relates to the halogenation of certain nuclear substituted anilides.

The preparation of nuclear substituted halo anilides and the halo substituted aromatic amines and acid salts thereof, which are easily prepared from the anilides, is of importance commercially since these compounds are used as intermediate products in the manufacture of dyes. Certain nuclear substituted halo anilides defined by the formula

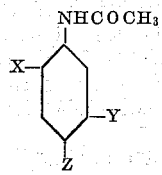

in which X is methyl or methoxy, Y is hydrogen or methyl, and Z is chlorine or bromine, are of particular value. These compounds are usually prepared by halogenation of the corresponding substituted anilide suspended or dissolved in a liquid diluent, e. g. benzene, toluene or acetic acid, which is substantially inert toward halogen under the conditions of the reaction. However, in the preparation of these substituted halo anilides by direct halogenation in this manner, difficulty is encountered due to the separation of solid materials from the mixture during the reaction in a form which renders agitation of the mixture difficult or impossible, and which thus leads to over-halogenation in parts of the mixture while other parts are unreacted. In many instances the entire reaction mixture becomes substantially a solid mass. To overcome this difficulty, relatively large quantities of a liquid diluent are ordinarily used; but this is undesirable, since it necessitates the recovery of large quantities of diluent, reduces the amount of material which can be produced in the equipment, reduces the yield, and thus adds to the cost of manufacture.

We have found that substituted halo anilides having the formula

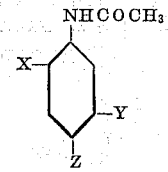

in which X is methyl or methoxy, Y is hydrogen or methyl, and Z is chlorine or bromine, can be readily prepared in high yield and with the use of a relatively small amount of liquid diluent by halogenating the corresponding substituted anilide while in the presence of a metal salt of an organic carboxylic acid.

Although a wide variety of diluents may be used, the reaction is conveniently carried out by first acetylating the substituted aromatic amine with a mixture of acetic anhydride and glacial acetic acid in the known manner and then halogenating the anilide so formed without separating it from the reaction mixture, whereby the acetic acid used and that formed during the acetylation serves as the diluent during the halogenation. In the acetylation, approximately one mol of acetic anhydride is usually used for each mol of substituted aromatic amine present. The amount of acetic acid which is used is usually less than three times the weight of the substituted anilide which is being halogenated, although this will vary somewhat with the particular halo anilide which is being prepared. Larger or smaller amounts may be used if desired. Alternatively, the anilide may be prepared separately and be mixed with, or dissolved in, the acetic acid or other diluent prior to halogenation.

A metal salt of an organic acid, e. g. potassium formate, sodium acetate, sodium benzoate, or sodium propionate, is then added to the mixture of anilide and inert diluent. Approximately one chemical equivalent of the salt is added for each mol of anilide present. All of the salt may be added at one time, or it may be added in portions during the halogenation if desired. In some instances the addition of all of the salt before halogenation is begun will produce a thick slurry which may be difficult to stir, and it is preferable in such cases to add the salt in portions during the course of the halogenation. However, the metal salt is added at such a rate that it is present at all times throughout the reaction period in a molecular proportion nearly equal to, or in excess of, the halogen added. The solution or suspension so prepared is treated with halogen until substantially one mol has been added for each mol of anilide present. Efficient agitation is preferably maintained throughout the reaction. The halogen is usually added over a period which may vary from less than twenty minutes to more than three hours, although the rate of addition is governed by the rate at which the halogen reacts with the anilide and by the efficiency of the cooling system employed. The mixture is usually maintained at a temperature between 10° and 80° C. during the halogenation. After the addition of the halogen is complete, the reaction mixture may be allowed to stand or may be warmed for a short time to complete the reaction. The mixture is then treated to separate the diluent from the substituted halo anilide. In case acetic acid is used as the diluent, the separation is usually effected by pouring the reaction mixture into cold water and filtering off the substituted halo anilide. Sodium chloride or other inorganic salt may be added to the water to decrease the solubility of the halo anilide if desired. After filtering, the substituted halo anilide may be washed with water and dried, or it may be used directly in other processes without drying. Alternatively, the reaction mixture may be heated, e. g. under vacuum, to drive off the liquid diluent.

*Example 1*

149 grams (1.0 mol) of 2-acetamino toluene, 224 grams of glacial acetic acid, and 82 grams (1.0 mol) of powdered anhydrous sodium acetate are stirred together at 45° C. and 78 grams (1.1 mol) of chlorine passed into the mixture over a two-hour period. The mixture is cooled during the reaction and is at a temperature of 15° C. when all of the chlorine has been added. The mixture changes from a thick slurry at the beginning of the reaction period to a very thin slurry at the end of the period. After all of the chlorine is added, stirring is continued for one hour and the mixture then poured with stirring into ice water and filtered. The precipitate is washed with a little cold water and dried. There is thus obtained 158 grams (.86 mol) or an 86 per cent yield of 2-acetamino-5-chlorotoluene, melting at 134–135° C.

When an attempt is made to duplicate the above experiment, but omitting the sodium acetate from the reaction mixture, separation of solid products occurs soon after beginning addition of the chlorine. The mixture becomes too thick to stir before more than about one-third of the chlorine has been added. Heating the solution to boiling or adding relatively large additional quantities of acetic acid does not thin the mixture so it can be stirred, and it is impossible to finish the chlorination.

*Example 2*

53.6 grams (.5 mol) of ortho toluidine is acetylated with a mixture of 57.6 grams (.55 mol) of 97.7 per cent acetic anhydride and 136.5 grams of glacial acetic acid. The reacted mixture is cooled to 20–30° C. and 43.1 grams (.525 mol) of sodium acetate is added. 84 grams of bromine (.525 mol) is then added over a period of twenty minutes while maintaining the mixture at 20–30° C. Stirring is continued during the entire reaction period, and the reacted mixture, which is semi-fluid at all times and may be stirred easily, is warmed to 60° C. for thirty minutes. It is then poured with stirring into cold water, and the precipitate filtered, washed with cold water, and dried. There is thus obtained 108 grams (.475 mol) or a 95 per cent yield of 5-bromo-2-acetamino toluene melting at 155–157° C.

*Example 3*

137.1 grams (1 mol) of 3-amino-4-methoxy toluene is acetylated with a mixture of 114.9 grams (1.1 mol) of 97.7 per cent acetic anhydride and 145 grams of glacial acetic acid at a temperature of 35–50° C. The temperature is maintained at 50–60° C. for one hour to complete the acetylation. The mixture is then cooled to 20° C., and 35 grams additional acetic acid and 86.1 grams (1.05 mols) of sodium acetate is added. 74.6 grams (1.05 mol) of chlorine is passed into the solution at a temperature of 20–24° C. over a period of one and one-half hours; after which the temperature is maintained at 60° C. for one-half hour. The reaction mixture is then poured into 3 liters of cold water. The mixture is filtered, and the precipitate washed on the filter with a small amount of cold water, and then dried. There is thus obtained 202 grams (.90 mol), or a 90 per cent yield of 3-acetamino-4-methoxy-6-chlorotoluene, melting at from 112° to 114° C.

*Example 4*

45 grams (.371 mol) of 2-amino-1.4-xylene is acetylated by warming to 35–50° C. for twenty minutes with a mixture of 42.6 grams (.408 mol) of 97.7 per cent acetic anhydride and 58 grams of acetic acid. The mixture is then warmed to 55–60° C. for one hour to complete the acetylation, and 50 grams additional acetic acid and 32 grams (.39 mol) of sodium acetate are added. 28 grams (.39 mol) of chlorine is then added to the mixture over a period of forty minutes, while maintaining the temperature at 20–40° C. after which the mixture is warmed to 60° C. for one-half hour. The reacted mixture is then cooled and poured into cold water, and filtered. The precipitate is washed with a small amount of cold water and dried. There is thus obtained 62 grams (.314 mol), or an 85 per cent yield, of 2-acetamino-5-chloro-1.4-xylene, melting at 167–169° C.

Other modes of applying the principle of the invention may be employed instead of those explained, change being made as regards the process herein disclosed, provided the step or steps stated by any of the following claims or the equivalent of such stated step or steps be employed.

We therefore particularly point out and distinctly claim as our invention:

1. The method of halogenating a substituted acid anilide having the formula

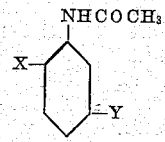

wherein X is a member of the group consisting of methyl and methoxy radicals and Y is a member of the group consisting of hydrogen and methyl radical, to form a mono-halogenated derivative thereof, which comprises adding to the acid anilide in an inert non-aqueous liquid medium at least 0.75 mol of an alkali metal salt of a lower aliphatic mono-carboxylic acid and approximately one mol of the halogen, while stirring the reaction mixture and maintaining the temperature thereof between 10° and 80° C.

2. The method of chlorinating a substituted acid anilide having the formula

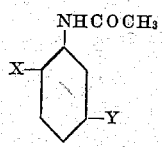

wherein X is a member of the group consisting of methyl and methoxy radicals and Y is a member of the group consisting of hydrogen and methyl radical, to form a mono-chlorinated derivative thereof, which comprises adding to the acid an-